United States Patent [19]

Chang

[11] Patent Number: 5,566,176
[45] Date of Patent: Oct. 15, 1996

[54] PARAMETER SETTING METHOD FOR PLC COMMUNICATION SYSTEM

[75] Inventor: Seong W. Chang, Anyang, Rep. of Korea

[73] Assignee: LG Industrial Systems Co., Ltd., Seoul, Rep. of Korea

[21] Appl. No.: 494,550

[22] Filed: Jun. 26, 1995

[30] Foreign Application Priority Data

Jul. 7, 1994 [KR] Rep. of Korea ............. 16343/1994

[51] Int. Cl.⁶ .................. G06F 17/30; H04L 5/22
[52] U.S. Cl. .................. 370/82; 395/200.17
[58] Field of Search .................. 370/17, 79, 82, 370/85.1, 94.1, 99; 395/200.13, 200.16, 200.17, 480, 497.03, 497.04

[56] References Cited

U.S. PATENT DOCUMENTS

| | | | |
|---|---|---|---|
| 5,050,166 | 9/1991 | Cantoni et al. | 370/94.1 |
| 5,142,623 | 8/1992 | Staab et al. | 395/200.17 |
| 5,175,817 | 12/1992 | Adams et al. | 395/200.17 |
| 5,317,719 | 5/1994 | Rozmovits | 395/200.17 |
| 5,463,777 | 10/1995 | Bialkowski et al. | 395/200.17 |

*Primary Examiner*—Melvin Marcelo
*Attorney, Agent, or Firm*—Oliff & Berridge

[57] ABSTRACT

A parameter setting method for a PLC communication system. In a transmission mode, a self-station identification number is set, and transmitting data is divided into a plurality of blocks if it exceeds a predetermined size. Block identification numbers are assigned to the divided blocks, respectively. Then, a size of a desired one of the divided blocks is set. In a reception mode, a counterpart station identification number and a desired one of the block identification numbers are set. Also, a common reception region is set. Then, an individual reception region is set as needed. After the transmission and reception parameters are set, they are read whenever a user's program is completed. Data transmission and reception operations are performed according to the read transmission and reception parameters.

9 Claims, 10 Drawing Sheets

FIG.4A
CONVENTIONAL ART

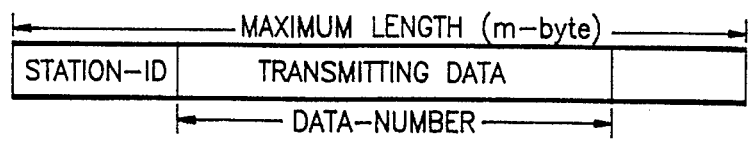

FIG.4B
CONVENTIONAL ART

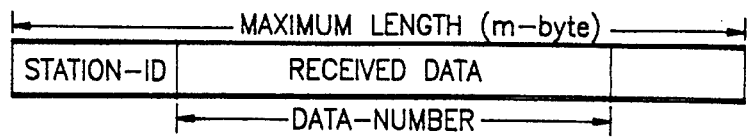

FIG.5A
CONVENTIONAL ART

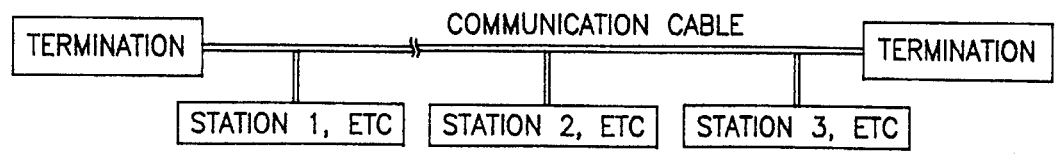

FIG.5B
CONVENTIONAL ART

| CLASSIFICATION | PARAMETER [1] TRANSMISSION | PARAMETER [2] RECEPTION | PARAMETER [3] RECEPTION |
|---|---|---|---|
| STATION-ID | 1 | 2 | x |
| DATA-POINTER | 100 | 400 | x |
| DATA-NUMBER | 100 | 50 | x |

FIG.5C
CONVENTIONAL ART

| CLASSIFICATION | PARAMETER [1] TRANSMISSION | PARAMETER [2] RECEPTION | PARAMETER [3] RECEPTION |
|---|---|---|---|
| STATION-ID | 2 | 1 | x |
| DATA-POINTER | 300 | 200 | x |
| DATA-NUMBER | 100 | 50 | x |

FIG.5D
CONVENTIONAL ART

| CLASSIFICATION | PARAMETER [1] TRANSMISSION | PARAMETER [2] RECEPTION | PARAMETER [3] RECEPTION |
|---|---|---|---|
| STATION-ID | x | 1 | 2 |
| DATA-POINTER | x | 300 | 500 |
| DATA-NUMBER | x | 50 | 100 |

FIG. 6
CONVENTIONAL ART
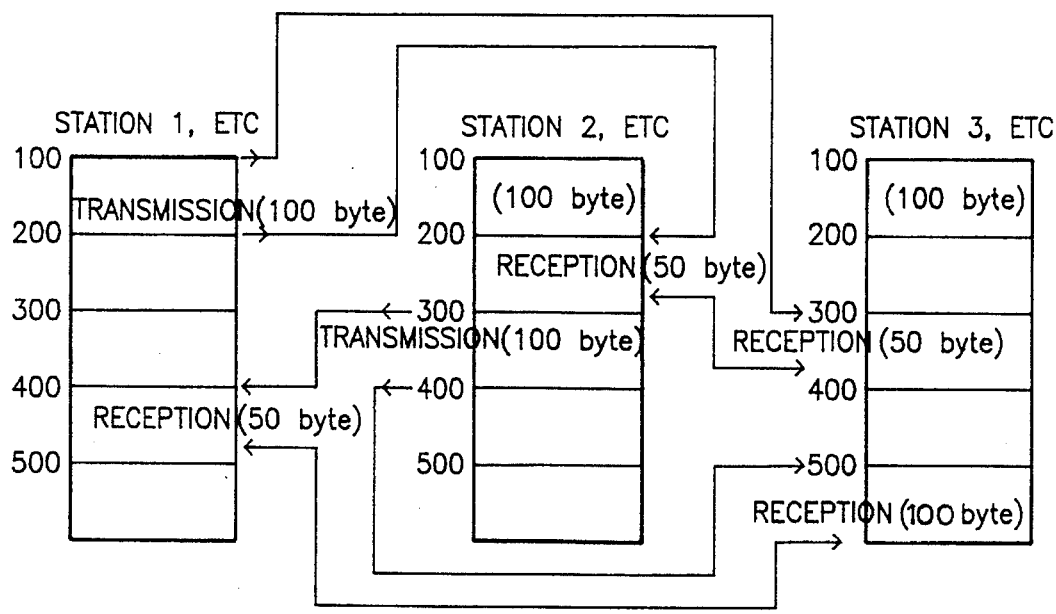
FIG. 7A
CONVENTIONAL ART
TRANSMITTING DATA FRAME FORMAT OF STATION 1
| STATION-ID #1 | DATA (100 byte) |
FIG. 7B
CONVENTIONAL ART
TRANSMITTING DATA FRAME FORMAT OF STATION 2
| STATION-ID #2 | DATA (100 byte) |
FIG. 7C
CONVENTIONAL ART
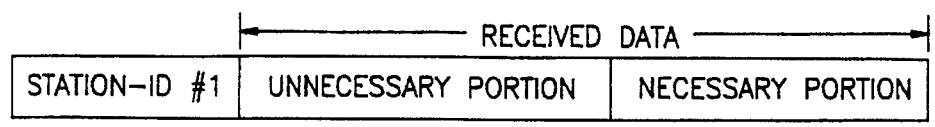

| DATA BLOCK [1] : m − byte |
| DATA BLOCK [2] : m − byte |
| ⋮ |
| DATA BLOCK [n−2] : m − byte |
| DATA BLOCK [n−1] : m − byte |
| DATA BLOCK [n] : m − byte |

FIG.12A

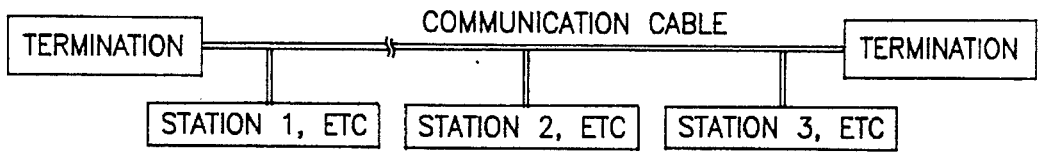

FIG.12B

| CLASSIFICATION | PARAMETER [1] TRANSMISSION | PARAMETER [2] RECEPTION | PARAMETER [3] RECEPTION |
|---|---|---|---|
| STATION – ID | 1 | 1 | 2 |
| DATA-BLOCK-ID | 1 | 5 | 3 |
| DATA – NUMBER | 100 | 100 | 30 |
| DATA – POINTER | 100 | 500 | 300 |
| INDIVIDUAL REGION IDENTIFICATION NUMBER | x | x | 50 |
| INDIVIDUAL REGION NUMBER | x | x | 30 |

FIG.12C

| CLASSIFICATION | PARAMETER [1] TRANSMISSION | PARAMETER [2] RECEPTION | PARAMETER [3] RECEPTION |
|---|---|---|---|
| STATION – ID | 2 | 2 | 1 |
| DATA-BLOCK-ID | 3 | 4 | 1 |
| DATA – NUMBER | 100 | 100 | 50 |
| DATA – POINTER | 300 | 400 | 100 |
| INDIVIDUAL REGION IDENTIFICATION NUMBER | x | x |  |
| INDIVIDUAL REGION NUMBER | x | x |  |

FIG.12D

| CLASSIFICATION | PARAMETER [1] TRANSMISSION | PARAMETER [2] RECEPTION | PARAMETER [3] RECEPTION |
|---|---|---|---|
| STATION – ID | 1 | 1 | 2 |
| DATA-BLOCK-ID | 1 | 5 | 4 |
| DATA – NUMBER | 100 | 50 | 50 |
| DATA – POINTER | 200 | 500 | 400 |
| INDIVIDUAL REGION IDENTIFICATION NUMBER | x | x | x |
| INDIVIDUAL REGION NUMBER | x | x | x |

(TRANSMITTING DATA FRAME FORMAT OF PARAMETER [1])

| PARAMETER | TRANSMITTING DATA (100 byte) |
|---|---|
| STATION-ID : #1 | DATA-BLOCK-ID : #1 |

(TRANSMITTING DATA FRAME FORMAT OF PARAMETER [2])

| PARAMETER | TRANSMITTING DATA (100 byte) |
|---|---|
| STATION-ID : #1 | DATA-BLOCK-ID : #5 |

PARAMETER SETTING METHOD FOR PLC COMMUNICATION SYSTEM

BACKGROUND OF THE INVENTION

1. Field of the Invention

The present invention relates in general to a PLC communication system, and more particularly to a parameter setting method for the PLC communication system which is capable of setting efficient parameters when a plurality of PLCs exchange rapid data through a single communication network, to enhance an efficiency of the PLC communication system.

2. Description of the Prior Art

Generally, a PLC communication system comprises a plurality of communication stations connected to a single communication network. Each of the communication stations comprises a PLC for exchanging rapid data through the single communication network. Each communication station sets parameters suitably to the other stations for data transmission and reception. Whenever a user's program is completed, each communication station performs the data transmission and reception with the other stations according to the set parameters. In this connection, the PLC communication system has mainly been used in applications such as high-speed data communication, cooperative work between the PLCs, monitoring, control and etc.

Referring to FIG. 1, there is shown a block diagram illustrating a construction of a conventional PLC communication system. As shown in this drawing, the conventional PLC communication system comprises n communication stations connected to a single communication cable to exchange data among them.

Referring to FIG. 2, there is shown a block diagram illustrating a construction of each of the n communication stations in FIG. 1. As shown in this drawing, each communication station comprises a PLC 100 for executing a user's program, a random access memory (referred to hereinafter as RAM) 200 for inputting and outputting data from/to the PLC 100, and a link controller 300 for inputting and outputting data from/to the RAM 200. The link controller 300 discriminates transmission and reception modes and performs a communication control operation in accordance with the discriminated modes.

Each communication station further comprises a transmitting data storage unit 400 for storing temporarily transmitting data of a self-station in the transmission mode, a received data storage unit 500 for storing temporarily data received from the other stations in the reception mode, and a data transmission/reception unit 600 for transmitting the self-station transmitting data from the transmitting data storage unit 400 to the other stations through the communication cable and storing the data from the other stations received through the communication cable into the received data storage unit 500.

FIG. 3 is a view illustrating a format of each of conventional parameters. As shown in this drawing, each parameter includes a station identification number Station-id, a data pointer Data-Pointer and a data number Data-Number. The station identification number Station-id designates a self-station identification number in the transmission mode or a counterpart station identification number in the reception mode. The data pointer Data-Pointer designates an address of the RAM 200 from which the transmitting data is to be read in the transmission mode or into Data-Number designates the byte number of the transmitting data in the transmission mode or the byte number of the received data in the reception mode. The parameters have the same format and are n in number which is equal to the maximum number of connectable communication stations. The n parameters are stored in a memory of the link controller 300.

The operation of the conventional PLC communication system with the above-mentioned construction and a conventional parameter setting method therefor will hereinafter be described in detail.

First, the user's program is executed in the PLC 100 of the self-station to set the parameters suitably to the other stations for the data transmission and reception. In the case where the transmission mode is set by the self-station to transmit data, the station identification number Station-id of the transmission parameter x is set to the self-station identification number. Also, the data pointer Data-Pointer of the transmission parameter x is set to the address of the RAM 200 from which the transmitting data is to be read. Further, the data number Data-Number of the transmission parameter x is set to the byte number of the transmitting data.

On the contrary, in the case where the reception mode is set by the self-station to receive data, the station identification number Station-id of the reception parameter x is set to the counterpart station identification number. Also, the data pointer Data-Pointer of the reception parameter x is set to the address of the RAM 200 from which the received data is to be written. Further, the data number Data-Number of the reception parameter x is set to the byte number of the received data. Here, the counterparts or the other stations are n−1 in number, except the self-station. A maximum length of data which can be transmitted at a time is limited to m bytes.

With one transmission parameter and n−1 reception parameters set as mentioned above, the link controller 300 checks errors of the set parameters. Whenever the user's program is completed in the PLC 100, the link controller 300 performs the data transmission and reception operations, as will hereinafter be described with reference to FIG. 8 which is a flowchart illustrating a conventional communication program.

When the user's program is completed, the PLC 100 transfers a program end signal scan-end to the link controller 300 through the RAM 200. Upon receiving the program end signal scan-end from the PLC 100 at the step 1, the link controller 300 reads sequentially the set first to nth parameters at the step 2 and compares the station identification numbers Station-id of the read parameters with the self-station identification number at the step 3. If each of the station identification numbers Station-id of the read parameters is the same as the self-station identification number at the step 3, the link controller 300 performs the data transmission operation. On the contrary, the link controller 300 performs the data reception operation if each of the station identification numbers Station-id of the read parameters is not the same as the self-station identification number at the step 3.

In the transmission mode, the link controller 300 sets a data source to the address of the RAM 200 designated by the data pointer Data-Pointer of the transmission parameter x, at the step 4. Also at the step 4, the link controller 300 sets a destination to a location of the transmitting data storage unit 400. Further at the step 4, the link controller 300 sets the number of data bytes to the data number Data-Number of the transmission parameter x. Then, the link controller 300 transfers data from the data source to the destination by the set number of bytes at the step 5. It is checked at the step 6 whether the transmission parameter x is the last one. If it is checked at the step 6 that the transmission parameter x is the last one, the link controller 300 completes the data transmission operation at the step 12. On the contrary, if the transmission parameter x is not the last one at the step 6, the link controller 300 increments the transmission parameter x by one at the step 7 to read the subsequent parameter at the step 2.

Subsequently, the data transmission/reception unit 600 reads the data stored in the transmitting data storage unit 400 and transmits the read data to the other stations through the communication cable. At this time, the transmitting data has a frame format as shown in FIG. 4A. As shown in this drawing, the transmitting data includes the station identification number of the transmitting station appended in its header and has the maximum length of m bytes.

The transmitted data from the transmitting station is received simultaneously by all the other stations. The data transmission/reception unit 600 stores the received data into the received data storage unit 500 only when the station identification number of the received data is the same as that of the reception parameter.

In the reception mode, if the station identification number of the data stored in the received data storage unit 500 is the same as that of the reception parameter x, the link controller 300 sets a data source to a location of the received data storage unit 500 in which the received data is stored, at the step 8. Also at the step 8, the link controller 300 sets a destination to the address of the RAM 200 designated by the data pointer Data-Pointer of the reception parameter x. Further at the step 8, the link controller 300 sets the number of bytes to the data number Data-Number of the reception parameter x. Then, the link controller 300 transfers the received data from the data source to the destination by the set number of bytes at the step 9. As a result, the received data is sent to the PLC 100. It is checked at the step 10 whether the reception parameter x is the last one. If it is checked at the step 10 that the reception parameter x is the last one, the link controller 300 completes the data reception operation at the step 12. On the contrary, if the reception parameter x is not the last one at the step 10, the link controller 300 increments the reception parameter x by one at the step 11 to read the subsequent parameter at the step 2.

The above-mentioned data transmission and reception operations will hereinafter be described in more detail with reference to FIGS. 5A to 7C.

It is first assumed that first to third communication stations are connected to a single communication cable as shown in FIG. 5A, which have parameters x set as shown in FIGS. 5B to 5D, respectively.

The first communication station transmits data of 100 bytes beginning with the address 100 of the RAM 200 on the basis of the set first parameter. The first communication station also stores data received from the second communication station by 50 bytes beginning with the address 400 of the RAM 200 on the basis of the set second parameter. Then, the first communication station does not perform the data reception operation according to the third parameter because no station identification number is designated.

The second communication station transmits data of 100 bytes beginning with the address 300 of the RAM 200 on the basis of the set first parameter. The second communication station also stores data received from the first communication station by 50 bytes beginning with the address 200 of the RAM 200 on the basis of the set second parameter. Then, the second communication station does not perform the data reception operation according to the third parameter because no station identification number is designated.

The third communication station does not perform the data transmission operation according to the first parameter because no station identification number is designated. The third communication station stores data received from the first communication station by 50 bytes beginning with the address 300 of the RAM 200. The third communication station also stores data received from the second communication station by 100 bytes beginning with the address 500 of the RAM 200 on the basis of the set third parameter.

In detail, in the case of reading the first parameter (x=1), the link controller 300 of the first communication station determines the transmission mode because the station identification number Station-id of the read first parameter is the same as the self-station identification number #1. In this case, the link controller 300 produces the transmitting data as shown in FIG. 7A by adding the self-station identification number #1 to the data of 100 bytes beginning with the address 100 of the RAM 200 designated by the data pointer Data-Pointer of the first parameter. Then, the link controller 300 stores the transmitting data into the transmitting data storage unit 400. The data transmission/reception unit 600 transmits the stored data from the transmitting data storage unit 400 simultaneously to the other stations through the communication cable.

In the case of reading the second parameter (x=2), the link controller 300 of the first communication station determines the reception mode because the station identification number Station-id of the read second parameter is not the same as the self-station identification number #1. In this case, the link controller 300 stores the data transmitted from the second communication station as shown in FIG. 7B by 50 bytes beginning with the address 400 of the RAM 200 designated by the data pointer Data-Pointer of the second parameter.

Upon reading the third parameter (x=3), the link controller 300 of the first communication station does not perform the data reception operation because no station identification number is designated. Then, the link controller 300 discriminates whether the read third parameter is the last one. Since the third parameter is the last one, the link controller 300 completes the data reception operation.

In the case of reading the first parameter (x=1), the link controller 300 of the second communication station determines the transmission mode because the station identification number Station-id of the read first parameter is the same as the self-station identification number #2. In this case, the link controller 300 produces the transmitting data as shown in FIG. 7B by adding the self-station identification number #2 to the data of 100 bytes beginning with the address 300 of the RAM 200 designated by the data pointer Data-Pointer of the first parameter. Then, the link controller 300 stores the transmitting data into the transmitting data storage unit 400. The data transmission/reception unit 600 transmits the stored data from the transmitting data storage unit 400 simultaneously to the other stations through the communication cable.

In the case of reading the second parameter (x=2), the link controller 300 of the second communication station determines the reception mode because the station identification number Station-id of the read second parameter is not the same as the self-station identification number #2. In this case, the link controller 300 stores the data transmitted from the first communication station as shown in FIG. 7A by 50 bytes beginning with the address 200 of the RAM 200 designated by the data pointer Data-Pointer of the second parameter.

Upon reading the third parameter (x=3), the link controller 300 of the second communication station does not perform the data reception operation because no station identification number is designated. Then, the link controller 300 discriminates whether the read third parameter is the last one. Since the third parameter is the last one, the link controller 300 completes the data reception operation.

When reading the first parameter (x=1), the link controller 300 of the third communication station does not perform the data transmission operation because no station identification number is designated.

In the case of reading the second parameter (x=2), the link controller 300 of the third communication station determines the reception mode because the station identification number Station-id of the read second parameter is not the same as the self-station identification number #3. In this case, the link controller 300 stores the data transmitted from the first communication station as shown in FIG. 7A by 50 bytes beginning with the address 300 of the RAM 200 designated by the data pointer Data-Pointer of the second parameter.

Upon reading the third parameter (x=3), the link controller 300 of the third communication station determines the reception mode because the station identification number Station-id of the read third parameter is not the same as the self-station identification number #3. In this case, the link controller 300 stores the data transmitted from the second communication station as shown in FIG. 7B by 100 bytes beginning with the address 500 of the RAM 200 designated by the data pointer Data-Pointer of the third parameter. Then, the link controller 300 discriminates whether the third parameter is the last one. Since the third parameter is the last one, the link controller 300 completes the data reception operation.

FIG. 6 is a view illustrating the flow of the transmitting and received data as mentioned above.

In the above manner, the communication stations connected to the single communication cable read sequentially the set parameters and perform the data transmission or reception operation in accordance with the read result to exchange the data among them.

However, in the case where various data such as, for example, the data of the addresses 300 and 500 as well as the address 100 of the RAM 200 are transmitted by the first communication station under the condition that the parameters are set as shown in FIGS. 5B to 5D, they cannot be distinguished from one another by the second and third communication stations. For this reason, only one transmission parameter must be set, resulting in a frame of data transmittable in one communication station being limited to 100 bytes at the maximum. Also, it is impossible to designate only a desired portion of the received data because the received data is stored from the beginning. As a result, in the case where data as shown in FIG. 7C is received, a desired portion thereof must be stored together with an unnecessary portion thereof.

As mentioned above, the conventional parameter setting method sets only one of the n parameters to the transmission parameter. For this reason, a maximum length of data which can be transmitted at a time is limited to m bytes, thereby making large scale data transmission impossible. Also, in the reception mode, the receiving station stores the received data from the beginning by the byte number set by the self-station parameter, thereby causing a desired portion of the received data to be stored together with an unnecessary portion thereof. In this connection, a communication efficiency is degraded due to losses in memory capacity and data transfer time.

SUMMARY OF THE INVENTION

Therefore, the present invention has been made in view of the above problems, and it is an object of the present invention to provide a parameter setting method for a PLC communication system in which, in a transmission mode, data exceeding a predetermined size is transmitted while being divided into a plurality of blocks and, in a reception mode, a desired portion of received data is selectively stored according to a common reception region and an individual reception region set in a parameter, so that the transmitting data can be free in size and losses in memory capacity and data transfer time can be minimized to enhance a communication efficiency.

In accordance with the present invention, the above and other objects can be accomplished by a provision of a parameter setting method for a PLC communication system, comprising a transmission parameter setting step of setting a self-station identification number in a transmission mode, dividing transmitting data into a plurality of blocks if it exceeds a predetermined size, assigning block identification numbers to the divided blocks, respectively, and setting a size of a desired one of the divided blocks; a reception parameter setting step of setting a counterpart station identification number and a desired one of the block identification numbers in a reception mode, setting a common reception region and setting an individual reception region as needed; and a data transmitting/receiving step of reading the transmission and reception parameters whenever a user's program is completed after the transmission and reception parameters are set and performing data transmission and reception operations according to the read transmission and reception parameters.

BRIEF DESCRIPTION OF THE DRAWINGS

The above and other objects, features and advantages of the present invention will be more clearly understood from the following detailed description taken in conjunction with the accompanying drawings, in which:

FIGS. 4A and 4B are views illustrating frame formats of conventional transmitting and received data, respectively;

FIGS. 5A to 5D are views illustrating examples in which the conventional parameters in FIG. 3 are set;

FIG. 6 is a view illustrating the flow of transmitting and received data in FIGS. 5A to 5D;

FIGS. 7A to 7C are views illustrating frame formats of the transmitting and received data in FIG. 6, respectively;

FIGS. 12A to 12D are views illustrating examples in which the parameters in FIG. 9 are set in accordance with the present invention;

DETAILED DESCRIPTION OF THE PREFERRED EMBODIMENTS

Figure 1:
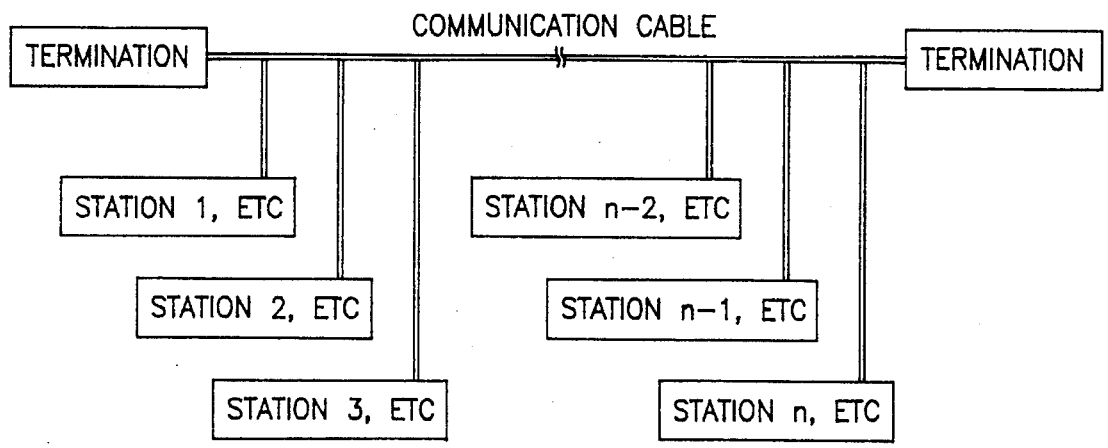
FIG. 1 is a block diagram illustrating a construction of a conventional PLC communication system.
Figure 2:
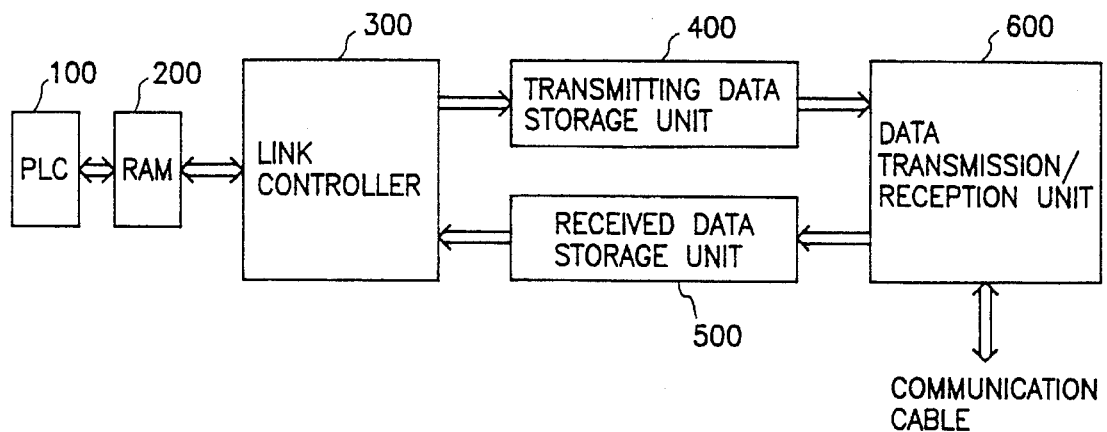
FIG. 2 is a block diagram illustrating a construction of a communication station in FIG. 1.
Figure 3:
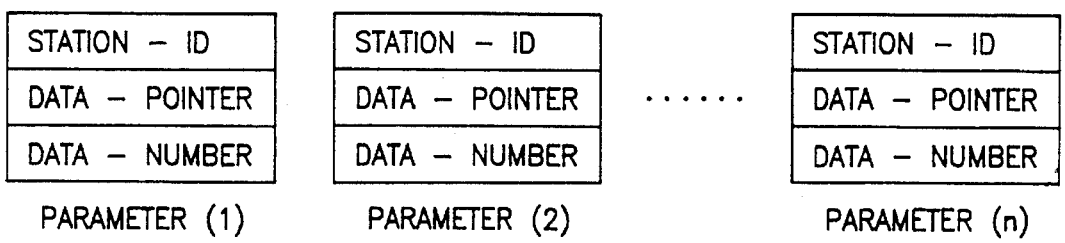
FIG. 3 is a view illustrating a format of each of conventional parameters.
Figure 8:
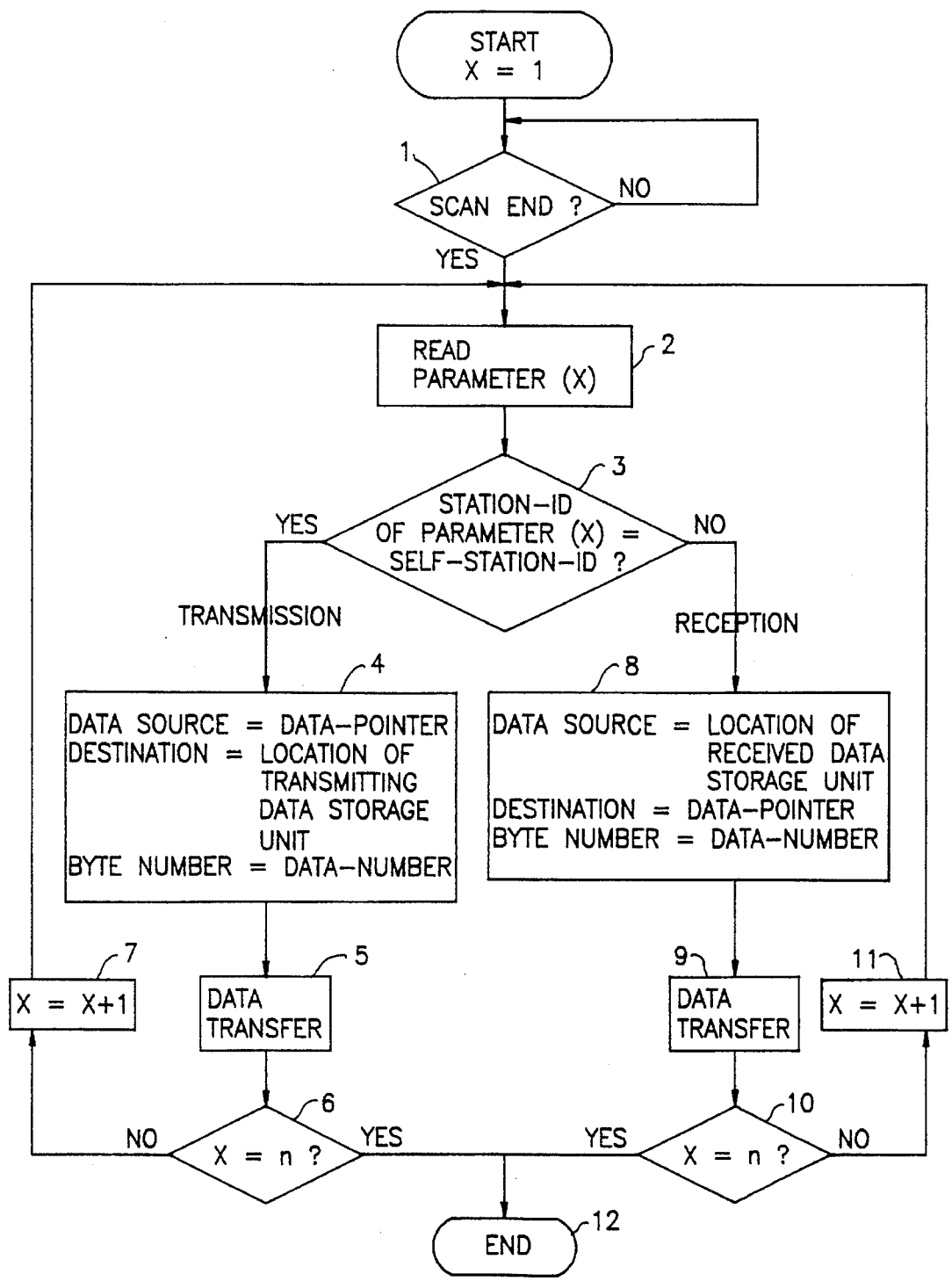
FIG. 8 is a flowchart illustrating a conventional communication program.

As stated previously with reference to FIG. 1, the PLC communication system comprises the n communication stations connected to the single communication cable to exchange the data among them. Each of the n communication stations comprises, as shown in FIG. 2, the PLC 100, the RAM 200, the link controller 300, the transmitting data storage unit 400, the received data storage unit 500 and the data transmission/reception unit 600. The PLC 100 executes the user's program. The RAM 200 inputs and outputs the data from/to the PLC 100 and the link controller 300 inputs and outputs the data from/to the RAM 200. The link controller 300 also discriminates the transmission and reception modes and performs the communication control operation in accordance with the discriminated modes. The transmitting data storage unit 400 stores temporarily the transmitting data of the self-station in the transmission mode and the received data storage unit 500 stores temporarily the data received from the other stations in the reception mode. The data transmission/reception unit 600 transmits the self-station transmitting data from the transmitting data storage unit 400 to the other stations through the communication cable. The data transmission/reception unit 600 also stores the data from the other stations received through the communication cable into the received data storage unit 500.

Figures 9, 10:
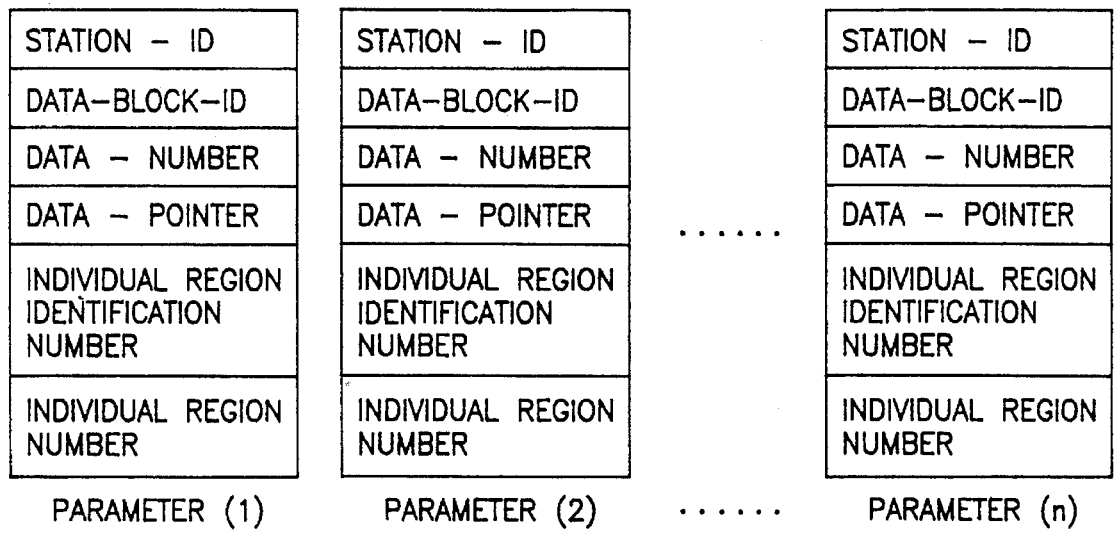
FIG. 9 is a view illustrating a format of each of parameters in accordance with the present invention.
FIG. 10 is a view illustrating a data block format in accordance with the present invention.

FIG. 9 is a view illustrating a format of each of parameters in accordance with the present invention. As shown in this drawing, each parameter includes a station identification number Station-id, a data block identification number Data-block-id, a data pointer Data-Pointer, a data number Data-Number, an individual region identification number and an individual region number. The station identification number Station-id designates a self-station identification number in the transmission mode or a counterpart station identification number in the reception mode. The data block identification number Data-block-id designates a number of each of a plurality of blocks into which the transmitting data is divided in the transmission mode when it exceeds m bytes. The data number Data-Number designates the byte number of the transmitting data in the transmission mode or the byte number of the received data corresponding to a common reception region in the reception mode. The data pointer Data-Pointer designates an address of the RAM 200 from which the transmitting data is to be read in the transmission mode or into which the received data is to be written in the reception mode.

The station identification number Station-id and the data block identification number Data-block-id are positioned in high-order 2 bytes of the transmitting data, and each of them may be any one of 1 to n. The data block identification number Data-block-id is assigned to each of the n blocks of the transmitting data, so that only a desired one of the n blocks can selectively be transmitted and received in the data transmission and reception operations.

The parameters have the same format and are n in number which is equal to the maximum number of connectable communication stations. Therefore, the n station identification numbers Station-id and the n data block identification numbers Data-block-id can be transmitted together, thereby allowing n*m-byte data transmission to be performed at the maximum. In result, according to the present invention, the byte number of the transmittable data is n times as much as that in the conventional PLC communication system.

The individual region identification number and the individual region number are not significant in the transmission parameter but in the reception parameter. The individual region number designates the byte number of the received data corresponding to an individual reception region in the reception mode. The individual region identification number designates a byte point of the received data corresponding to the individual reception region in the reception mode. The n parameters with the above-mentioned formats are stored in the memory of the link controller 300.

FIG. 10 is a view illustrating a data block format in accordance with the present invention. As shown in this drawing, the transmitting data is divided into the n blocks for the transmission thereof when it exceeds m bytes. The divided n blocks are transmitted with the corresponding data block identification numbers Data-block-id. Therefore, it is possible to perform the n*m-byte data transmission at the maximum.

Figure 11A:
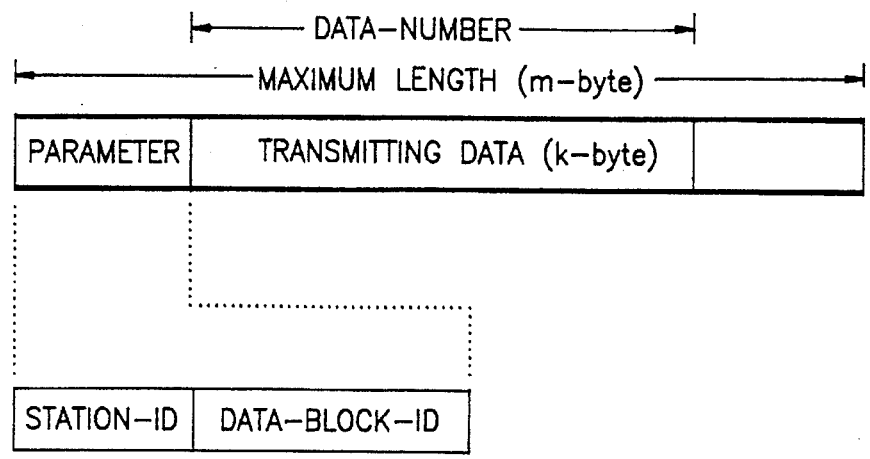
FIGS. 11A and 11B are views illustrating frame formats of transmitting and received data in accordance with the present invention, respectively.

FIG. 11A is a view illustrating a frame format of the transmitting data in accordance with the present invention. As shown in this drawing, a maximum length of the transmittable data is limited to m bytes in the unit of block. The station identification number Station-id and the data block identification number Data-block-id are appended in the high-order 2 bytes of the transmitting data in the transmission mode to allow a receiving station to recognize the transmitting data.

Figure 11B:
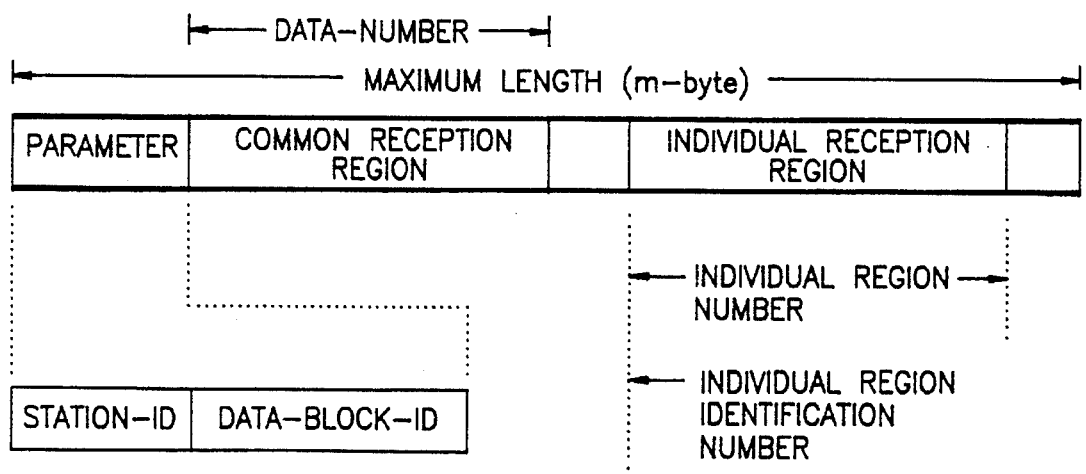

FIG. 11B is a view illustrating a frame format of the received data in accordance with the present invention. As shown in this drawing, a maximum length of the receivable data is limited to m bytes in the unit of block. The common reception region and the individual reception region are set in the reception parameter to allow a desired individual portion of the received data to be received in the reception mode.

The operation of the PLC communication system with the above-mentioned construction and a parameter setting method therefor in accordance with the present invention will hereinafter be described in detail.

First, the user's program is executed in the PLC 100 of the self-station to set the parameters suitably to the other stations for the data transmission and reception. In the case where the transmission mode is set by the self-station to transmit data, the station identification number Station-id of the transmission parameter x is set to the self-station identification number. Also, the data pointer Data-Pointer of the transmission parameter x is set to the address of the RAM 200 from which the transmitting data is to be read. Further, the data number Data-Number of the transmission parameter x is set to the byte number of the transmitting data. On the other hand, in the case where the transmitting data exceeds m bytes in the unit of frame, it is divided into the n blocks as shown in FIG. 10 and then assigned with the data block identification numbers Data-block-id, respectively.

On the contrary, in the case where the reception mode is set by the self-station to receive data, the station identification number Station-id of the reception parameter x is set to the counterpart station identification number. Also, the data block identification number Data-block-id of the reception parameter x is set to that corresponding to a desired one of the plurality of blocks into which the transmitting data are divided. Further, the data pointer Data-Pointer of the reception parameter x is set to the address of the RAM 200 from which the received data is to be written and the data number Data-Number of the reception parameter x is set to the byte number of the received data. On the other hand, when only a portion of the received data is required, the corresponding individual reception region is set as shown in FIG. 11B to store selectively the required data portion.

Figure 15:
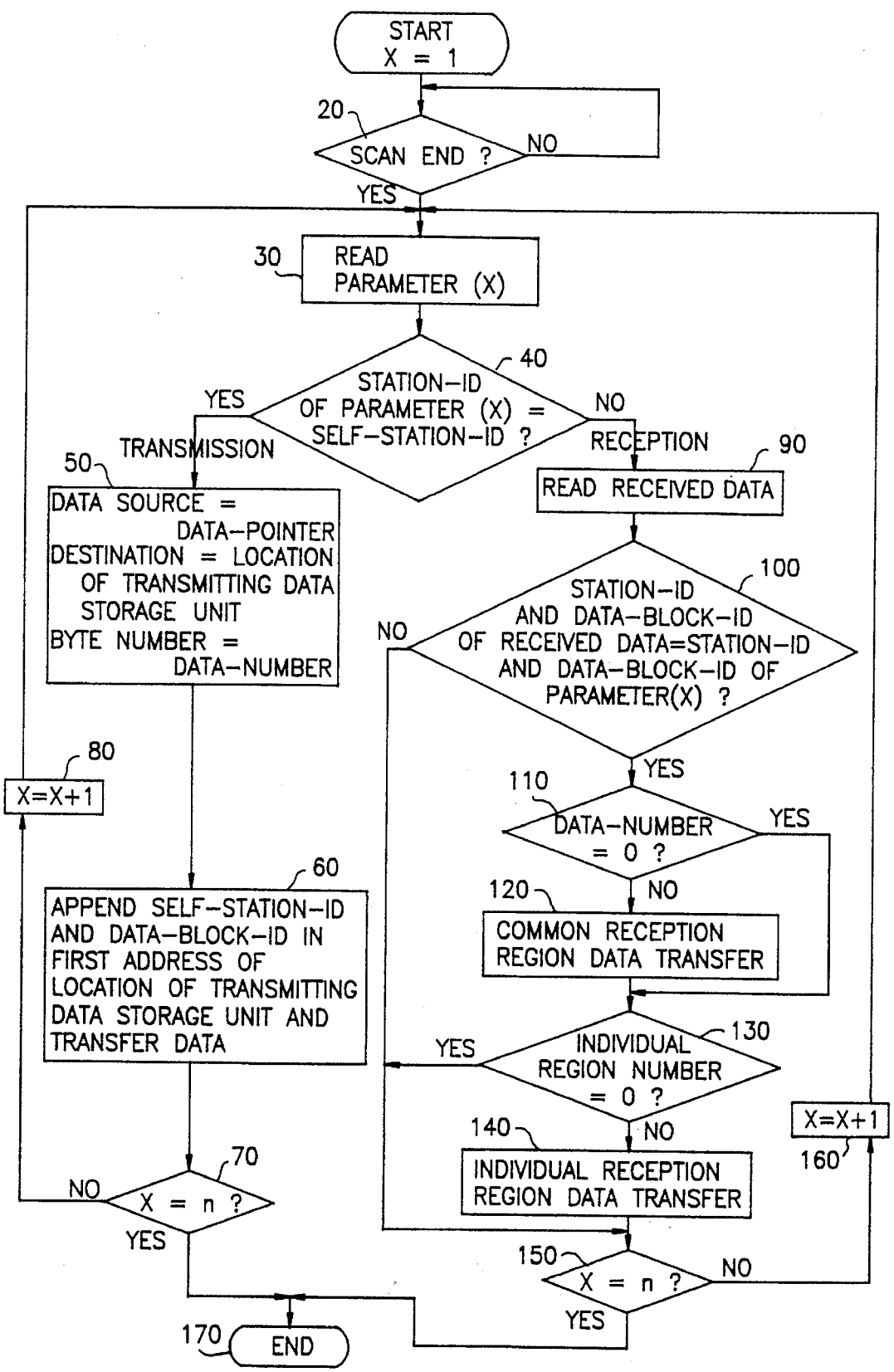
FIG. 15 is a flowchart illustrating a communication program in accordance with the present invention.

With the transmission and reception parameters set as mentioned above, the link controller 300 checks errors of the set parameters. Whenever the user's program is completed in the PLC 100, the link controller 300 performs the data transmission and reception operations, as will hereinafter be described with reference to FIG. 15 which is a flowchart illustrating a communication program in accordance with the present invention.

When the user's program is completed, the PLC 100 transfers a program end signal scan-end to the link controller 300 through the RAM 200. Upon receiving the program end signal scan-end from the PLC 100 at the step 20, the link controller 300 reads sequentially the set first to nth parameters at the step 30 and compares the station identification numbers Station-id of the read parameters with the self-station identification number at the step 40. If each of the station identification numbers Station-id of the read parameters is the same as the self-station identification number at the step 40, the link controller 300 performs the data transmission operation. On the contrary, the link controller 300 performs the data reception operation if each of the station identification numbers Station-id of the read parameters is not the same as the self-station identification number at the step 40.

In the transmission mode, the link controller 300 sets a data source to the address of the RAM 200 designated by the data pointer Data-Pointer of the transmission parameter x, at the step 50. Also at the step 50, the link controller 300 sets a destination to a transmitting location of the transmitting data storage unit 400. Further at the step 50, the link controller 300 sets the number of bytes to the data number Data-Number of the transmission parameter x. At this time, the self-station identification number and the block identification number are appended in the first address of the transmitting location of the transmitting data storage unit 400. Then, the link controller 300 transfers data from the data source to the destination by the set number of bytes at the step 60. It is checked at the step 70 whether the transmission parameter x is the last one. If it is checked at the step 70 that the transmission parameter x is the last one, the link controller 300 completes the data transmission operation at the step 170. On the contrary, if the transmission parameter x is not the last one at the step 70, the link controller 300 increments the transmission parameter x by one at the step 80 to read the subsequent parameter at the step 30.

In result, the link controller 300 transfers the data from the RAM 200 to the transmitting location of the transmitting data storage unit 400, and the data transmission/reception unit 600 reads the data stored in the transmitting data storage unit 400 and transmits the read data to the other stations through the communication cable. At this time, as shown in FIG. 11A, the transmitting data includes the self-station identification number and the block identification number appended in its header and has the maximum length of m bytes. The transmitted data from the transmitting station is received simultaneously by all the other stations. The data transmission/reception unit 600 stores the received data into the received data storage unit 500 only when the station identification number of the received data is the same as that of the reception parameter.

In the reception mode, the link controller 300 reads the received data stored in the received data storage unit 500 at the step 90 to compare the station identification number and the block identification number appended in the high-order 2 bytes of the received data with those of the reception parameter x at the step 100. If the station identification number and the block identification number of the received data are not the same as those of the reception parameter x at the step 100, it is checked at the step 150 whether the reception parameter x is the last one. On the contrary, if the station identification number and the block identification number of the received data are the same as those of the reception parameter x at the step 100, it is checked at the step 110 whether the data number Data-Number of the reception parameter x designating the data byte number in the common reception region is "0".

If it is checked at the step 110 that the data number Data-Number of the reception parameter x is not "0" because of the presence of the common reception region in the reception parameter x, the link controller 300 reads the received data from the received data storage unit 500 by the data number Data-Number of the reception parameter x and transfers the read data to the address of the RAM 200 designated by the data pointer Data-Pointer of the reception parameter x, at the step 120.

On the contrary, if it is checked at the step 110 that the data number Data-Number of the reception parameter x is "0", the check is made at the step 130 on whether the individual region number of the reception parameter x is "0". If the individual region number of the reception parameter x is "0" at the step 130, it is checked at the step 150 whether the reception parameter x is the last one. If it is checked at the step 150 that the reception parameter x is the last one, the link controller 300 completes the data reception operation at the step 170. On the contrary, if the reception parameter x is not the last one at the step 150, the link controller 300 increments the reception parameter x by one at the step 160 to read the subsequent parameter at the step 30.

If it is checked at the step 130 that the individual region number of the reception parameter x is not "0" because of the presence of the individual reception region in the reception parameter x, the link controller 300 reads the received data by the individual region number of the reception parameter x from a location of the received data storage unit 500 corresponding to the individual region identification number of the reception parameter x and transfers the read data to the address of the RAM 200 designated by the data pointer Data-Pointer of the reception parameter x at the step 140.

As a result, the link controller 300 transfers the received data from the data source to the destination at the step 140. In result, the received data is sent to the PLC 100. It is then checked at the step 150 whether the reception parameter x is the last one. If it is checked at the step 150 that the reception parameter x is the last one, the link controller 300 completes the data reception operation at the step 170. On the contrary, if the reception parameter x is not the last one at the step 150, the link controller 300 increments the reception parameter x by one at the step 160 to read the subsequent parameter at the step 30.

The above-mentioned data transmission and reception operations will hereinafter be described in more detail with reference to FIGS. 12A to 14C.

It is first assumed that first to third communication stations are connected to a single communication cable as shown in FIG. 12A, which have parameters x set as shown in FIGS. 12B to 12D, respectively.

The first communication station transmits data of 100 bytes beginning with the address 100 of the RAM 200 and data of 100 bytes beginning with the address 500 of the RAM 200 on the basis of the set first and second parameters. The first communication station also stores data received from the second communication station by 30 bytes beginning with the address 300 of the RAM 200 on the basis of the set third parameter. Then, the first communication station stores the received data by 30 bytes beginning with the 50th byte thereof on the basis of the set third parameter.

The second communication station transmits data of 100 bytes beginning with the address 300 of the RAM 200 and data of 100 bytes beginning with the address 400 of the RAM 200 on the basis of the set first and second parameters. The second communication station also stores data received from the first communication station by 50 bytes beginning with the address 100 of the RAM 200 on the basis of the set third parameter.

The third communication station stores data received from the first communication station by 50 bytes beginning with the address 200 of the RAM 200 and by 50 bytes beginning with the address 500 of the RAM 200 on the basis of the set first and second parameters. The third communication station also stores data received from the second communication station by 50 bytes beginning with the address 400 of the RAM 200 on the basis of the set third parameter.

Figures 14A, 14B, 14C:
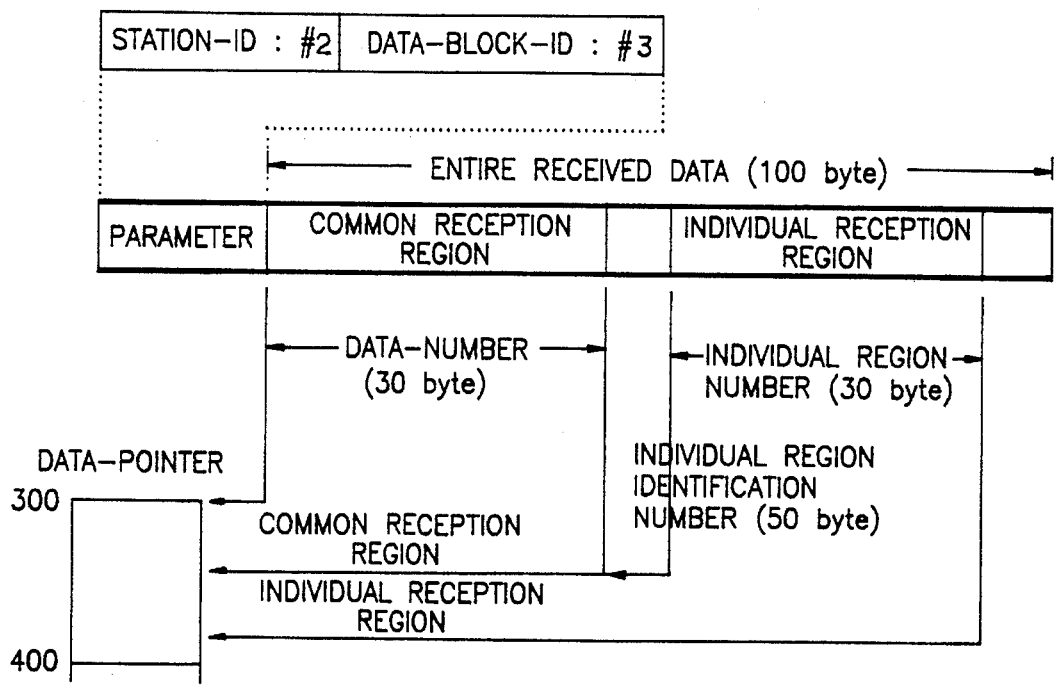
FIGS. 14A to 14C are views illustrating frame formats of the transmitting and received data in FIG. 13, respectively.

In detail, in the case of reading the first parameter (x=1), the link controller 300 of the first communication station determines the transmission mode because the station identification number Station-id of the read first parameter is the same as the self-station identification number #1. In this case, the link controller 300 produces the transmitting data as shown in FIG. 14A by adding the self-station identification number #1 and the block identification number #1 to the data of 100 bytes beginning with the address 100 of the RAM 200 designated by the data pointer Data-Pointer of the first parameter. Then, the link controller 300 stores the transmitting data into the transmitting data storage unit 400.

Upon reading the second parameter (x=2), the link controller 300 of the first communication station determines the transmission mode because the station identification number Station-id of the read second parameter is the same as the self-station identification number #1. In this case, the link controller 300 produces the transmitting data as shown in FIG. 14B by adding the self-station identification number #1 and the block identification number #5 to the data of 100 bytes beginning with the address 500 of the RAM 200 designated by the data pointer Data-Pointer of the second parameter. Then, the link controller 300 stores the transmitting data into the transmitting data storage unit 400. The data transmission/reception unit 600 transmits the stored data from the transmitting data storage unit 400 simultaneously to the other stations through the communication cable.

In the case of reading the third parameter (x=3), the link controller 300 of the first communication station determines the reception mode because the station identification number Station-id of the read third parameter is not the same as the self-station identification number #1. In this case, the link controller 300 stores the received data from the second communication station by 30 bytes beginning with the address 300 of the RAM 200 designated by the data pointer Data-Pointer of the third parameter, as shown in FIG. 14C. Then, the link controller 300 stores the received data by 30 bytes beginning with the 50th byte thereof because of the presence of the individual reception region in the third parameter. Finally, the link controller 300 discriminates whether the read third parameter is the last one. Since the third parameter is the last one, the link controller 300 completes the data reception operation.

In the case of reading the first parameter (x=1), the link controller 300 of the second communication station determines the transmission mode because the station identification number Station-id of the read first parameter is the same as the self-station identification number #2. In this case, the link controller 300 produces the transmitting data by adding the self-station identification number #2 and the block identification number #3 to the data of 100 bytes beginning with the address 300 of the RAM 200 designated by the data pointer Data-Pointer of the first parameter. Then, the link controller 300 stores the transmitting data into the transmitting data storage unit 400.

Upon reading the second parameter (x=2), the link controller 300 of the second communication station determines the transmission mode because the station identification number Station-id of the read second parameter is the same as the self-station identification number #2. In this case, the link controller 300 produces the transmitting data by adding the self-station identification number #2 and the block identification number #4 to the data of 100 bytes beginning with the address 400 of the RAM 200 designated by the data pointer Data-Pointer of the second parameter. Then, the link controller 300 stores the transmitting data into the transmitting data storage unit 400. The data transmission/reception unit 600 transmits the stored data from the transmitting data storage unit 400 simultaneously to the other stations through the communication cable.

In the case of reading the third parameter (x=3), the link controller 300 of the second communication station determines the reception mode because the station identification number Station-id of the read third parameter is not the same as the self-station identification number #2. In this case, the link controller 300 stores the received data from the first communication station by 50 bytes beginning with the address 100 of the RAM 200 designated by the data pointer Data-Pointer of the third parameter. Finally, the link controller 300 discriminates whether the read third parameter is the last one. Since the third parameter is the last one, the link controller 300 completes the data reception operation.

In the case of reading the first parameter (x=1), the link controller 300 of the third communication station determines the reception mode because the station identification number Station-id of the read first parameter is not the same as the self-station identification number #3. In this case, the link controller 300 stores the received data from the first communication station by 100 bytes beginning with the address 200 of the RAM 200 designated by the data pointer Data-Pointer of the first parameter.

In the case of reading the second parameter (x=2), the link controller 300 of the third communication station determines the reception mode because the station identification number Station-id of the read second parameter is not the same as the self-station identification number #3. In this case, the link controller 300 stores the received data from the first communication station by 50 bytes beginning with the address 500 of the RAM 200 designated by the data pointer Data-Pointer of the second parameter.

In the case of reading the third parameter (x=3), the link controller 300 of the third communication station determines the reception mode because the station identification number Station-id of the read second parameter is not the same as the self-station identification number #3. In this case, the link controller 300 stores the received data from the second communication station by 50 bytes beginning with the address 400 of the RAM 200 designated by the data pointer Data-Pointer of the third parameter. Finally, the link controller 300 discriminates whether the read third parameter is the last one. Since the third parameter is the last one, the link controller 300 completes the data reception operation.

Figure 13:
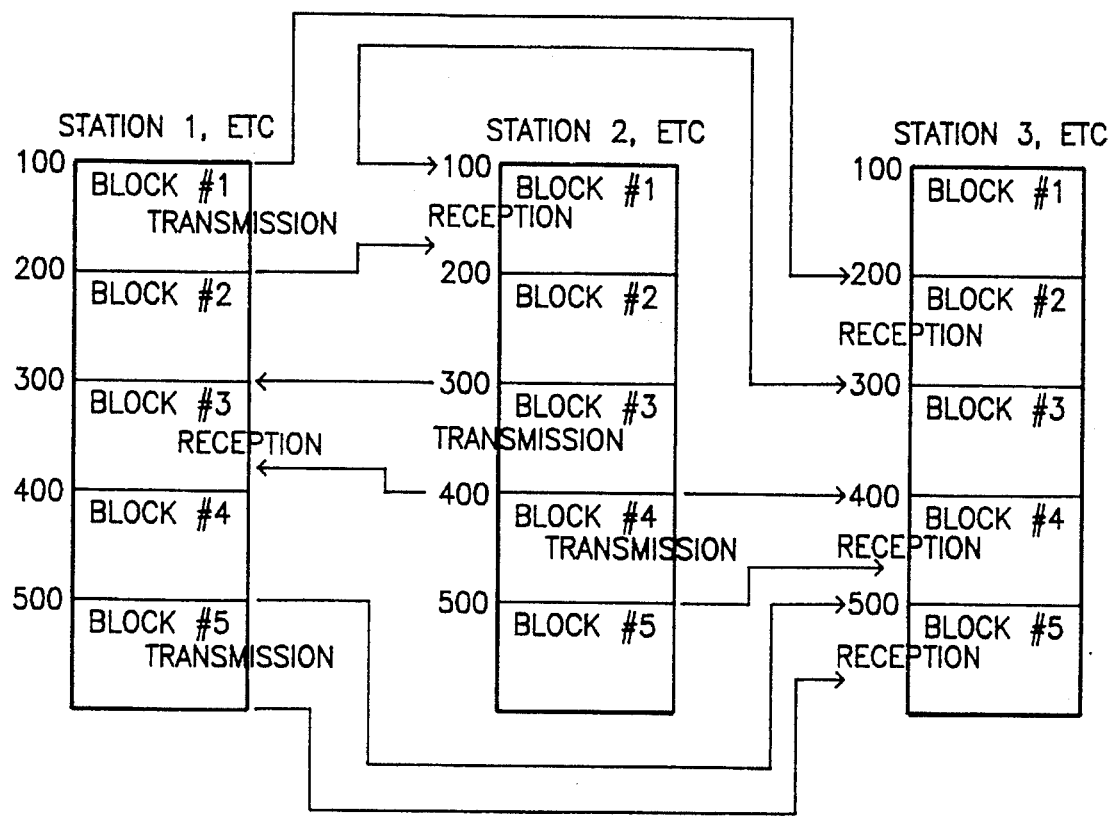
FIG. 13 is a view illustrating the flow of transmitting and received data in FIGS. 12A to 12D.

FIG. 13 is a view illustrating the flow of the transmitting and received data as mentioned above.

In the above manner, the communication stations connected to the single communication cable read sequentially the set parameters and perform the data transmission or reception operation in accordance with the read result to exchange the data among them.

As apparent from the above description, according to the present invention, in the transmission mode, the data exceeding m bytes is transmitted while being divided into the plurality of blocks. Therefore, the transmitting data can be free in size. In the reception mode, a desired portion of the received data is selectively stored according to the common reception region and the individual reception region set in the parameter. Therefore, losses in capacity of the RAM and data transfer time can be minimized to enhance the communication efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A parameter setting method for a PLC communication system, comprising:

a transmission parameter setting step of setting a self-station identification number in a transmission mode, dividing transmitting data into a plurality of blocks if it exceeds a predetermined size, assigning block identification numbers to the divided blocks, respectively, and setting a size of a desired one of the divided blocks;

a reception parameter setting step of setting a counterpart station identification number and a desired one of the block identification numbers in a reception mode, setting a common reception region and setting an individual reception region as needed; and a data transmitting/receiving step of reading said transmission and reception parameters whenever a user's program is completed after said transmission and reception parameters are set and performing data transmission and reception operations according to the read transmission and reception parameters.

2. A parameter setting method for a PLC communication system, as set forth in claim 1, wherein said transmission parameter setting step includes the steps of:

setting the self-station identification number in the transmission mode;

dividing the transmitting data into n blocks if it exceeds m bytes;

assigning the block identification numbers to the divided n blocks, respectively; and setting a size of a desired one of the divided n blocks.

3. A parameter setting method for a PLC communication system, as set forth in claim 2, wherein the self-station identification number and the block identification number are appended in a header of the transmitting data in the transmission mode.

4. A parameter setting method for a PLC communication system, as set forth in claim 2, wherein the transmitting data has a maximum length of m bytes in the unit of block so that m*n-byte data transmission can be performed at the maximum over the entire communication stations, where n is the number of the communication stations.

5. A parameter setting method for a PLC communication system, as set forth in claim 1, wherein said reception parameter setting step includes the steps of:

setting the counterpart station identification number and the desired block identification number in the reception mode;

setting the common reception region after the desired block identification number is set; and setting the individual reception region after the common reception region is set.

6. A parameter setting method for a PLC communication system, as set forth in claim 1, wherein said data transmitting/receiving step includes the step of receiving data in the reception mode only when a station identification number and a block identification number of the received data are the same as those set in the reception parameter.

7. A parameter setting method for a PLC communication system, as set forth in claim 6, wherein said data receiving step includes the steps of:

discriminating whether' the station identification number and the block identification number of the received data are the same as those set in the reception parameter;

discriminating whether the common reception region is set in the reception parameter, if the station identification number and the block identification number of the received data are the same as those set in the reception parameter;

receiving bytes of the received data corresponding to the common reception region if the common reception region is set in the reception parameter;

discriminating whether the individual reception region is set in the reception parameter, after the bytes of the received data corresponding to the common reception region are received;

receiving bytes of the received data corresponding to the individual reception region if the individual reception region is set in the reception parameter;

discriminating whether the reception parameter is the last one, after the bytes of the received data corresponding to the individual reception region are received; and completing the data reception operation if the reception parameter is the last one.

8. A parameter setting method for a PLC communication system, as set forth in claim 7, wherein the common reception region is set to store a designated number of bytes of the received data into a memory location designated by a data pointer.

9. A parameter setting method for a PLC communication system, as set forth in claim 5 or claim 7, wherein the individual reception region is set to store a specified number of bytes of the received data beginning with a byte point designated by an individual region identification number.

* * * * *